US010295650B2

(12) United States Patent
Qin

(10) Patent No.: US 10,295,650 B2
(45) Date of Patent: May 21, 2019

(54) METHOD AND DEVICE FOR DETERMINING VEHICLE SITE LOCATION

(71) Applicant: Beijing Baidu Netcom Science And Technology Co., Ltd., Beijing (CN)

(72) Inventor: Duohao Qin, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 289 days.

(21) Appl. No.: 15/392,045

(22) Filed: Dec. 28, 2016

(65) Prior Publication Data

US 2017/0192087 A1   Jul. 6, 2017

(30) Foreign Application Priority Data

Jan. 4, 2016   (CN) .......................... 2016 1 0003607

(51) Int. Cl.
*G01S 5/14*   (2006.01)
*H04W 4/02*   (2018.01)
(Continued)

(52) U.S. Cl.
CPC ................ *G01S 5/14* (2013.01); *G08G 1/127* (2013.01); *H04W 4/02* (2013.01); *H04W 4/023* (2013.01);
(Continued)

(58) Field of Classification Search
CPC ....... H04W 4/023; H04W 4/08; H04W 4/029; H04W 4/02; H04W 4/025; H04L 67/22
See application file for complete search history.

(56) References Cited

U.S. PATENT DOCUMENTS

2010/0017455 A1* 1/2010 Svendsen ............ H04L 12/1818
709/202
2013/0110395 A1* 5/2013 Morad .................. G01C 21/32
701/468
(Continued)

FOREIGN PATENT DOCUMENTS

CN   103973526 A   8/2014
CN   104318324 A   1/2015
(Continued)

OTHER PUBLICATIONS

Wikipedia—Great Circle Distance.*
(Continued)

*Primary Examiner* — Dung Hong
(74) *Attorney, Agent, or Firm* — Lathrop Gage LLP

(57) ABSTRACT

A method and a device for determining a vehicle site location are disclosed in the present disclosure. The method includes: obtaining location information of multiple users and location information of at least two central points; calculating a distance between each user and each of the at least two central points according to the location information of multiple users and the location information of at least two central points; clustering the multiple users into at least two groups according to the distance; updating the location information of the central point according to the location information of the users in each group; if the location information of the central point satisfies a preset condition, determining the vehicle site location according to the location information of the central points and the number of the users in each group.

11 Claims, 2 Drawing Sheets

(51) Int. Cl.
*H04W 4/42* (2018.01)
*G01C 21/26* (2006.01)
*G08G 1/127* (2006.01)
*H04W 4/029* (2018.01)

(52) U.S. Cl.
CPC ............ *G01C 21/26* (2013.01); *H04W 4/029* (2018.02); *H04W 4/42* (2018.02)

(56) References Cited

U.S. PATENT DOCUMENTS

| | | | | |
|---|---|---|---|---|
| 2013/0273942 | A1* | 10/2013 | Kaul | H04W 4/021 455/456.3 |
| 2014/0046591 | A1* | 2/2014 | Boldyrev | G01C 21/3438 701/533 |
| 2014/0244326 | A1 | 8/2014 | Modica et al. | |
| 2014/0280053 | A1* | 9/2014 | Derks | G06Q 10/10 707/722 |
| 2016/0034828 | A1* | 2/2016 | Sarawgi | G06Q 10/02 705/5 |
| 2016/0283578 | A1* | 9/2016 | Buck | G06F 16/9537 |
| 2017/0032291 | A1* | 2/2017 | Liu | G06Q 10/047 |
| 2017/0046644 | A1* | 2/2017 | Zhang | G08G 1/202 |

FOREIGN PATENT DOCUMENTS

| | | |
|---|---|---|
| CN | 104732756 A | 6/2015 |
| JP | 2001202352 A | 7/2001 |
| JP | 2013182280 A | 9/2013 |
| JP | 2014182611 A | 9/2014 |
| JP | 2015121908 A | 7/2015 |
| KR | 20110080574 A | 7/2011 |
| KR | 10-2011-0080574 * | 1/2012 |
| WO | WO 2015161828 A1 | 10/2015 |

OTHER PUBLICATIONS

Chinese Patent Application No. 201610003607.4, Second Office Action dated Apr. 10, 2017, with English translation, 11 pages.
Chinese Patent Application No. 201610003607.4, First Office Action dated Dec. 29, 2016, with English translation, 10 pages.
Korean Patent Application No. 20160132954 Office Action dated Apr. 3, 2018, 5 pages.
Korean Patent Application No. 20160132954 English translation of Office Action dated Apr. 3, 2018, 4 pages.
Japanese Patent Application No. 2016245175, Office Action dated Jan. 9, 2018, 7 pages.
Japanese Patent Application No. 2016245175, English translation of Office Action dated Jan. 9, 2018, 5 pages.

* cited by examiner

METHOD AND DEVICE FOR DETERMINING VEHICLE SITE LOCATION

CROSS REFERENCE TO RELATED APPLICATION

This application is based upon and claims a priority to Chinese Patent Application Serial No. 201610003607.4, filed with the State Intellectual Property Office of P.R. China on Jan. 4, 2016, the entire contents of which are incorporated herein by reference.

FIELD

The present disclosure relates to information network technology field, and more specifically to a method and a device for determining a vehicle site location.

BACKGROUND

Public transportation is one common way to travel for people in a daily life, e.g. people usually take a shuttle bus for commuting. Users are generally informed orally of stopping time and location of the shuttle buses, and then the users can wait for the shuttle buses at pre-determined time and location.

However, the shuttle bus may not be able to arrive and the predetermined location at the predetermined time, since traffic condition may change and special cases may occur. Similarly, the user who needs to take the shuttle bus may not be able to find the predetermined location and miss the shuttle bus because of, for example, being unfamiliar with the roads. In addition, the stopping location of the shuttle bus does not consider demands of all the users, such that the stopping site of the shuttle bus usually cannot satisfy the demand of the users.

SUMMARY

The present disclosure seeks to solve at least one of the problems existing in the related art to at least some extent.

For this, according to a first aspect of embodiments of the present disclosure, a method for determining a vehicle site location is proposed. The method includes: obtaining location information of multiple users and location information of at least two central points; calculating a distance between each user and each of the at least two central points according to the location information of multiple users and the location information of at least two central points; clustering the multiple users into at least two groups according to the distances; updating the location information of the central point according to the location information of the users in each group; if the location information of the central point satisfies a preset condition, determining the vehicle site location according to the location information of the central points and a number of the users in each group.

According to a second aspect of embodiments of the present disclosure, a device for determining a vehicle site location is proposed. The device includes one or more computing devices executing one or more software modules, and the one or more software modules includes: an obtaining module, configured to obtain location information of multiple users and location information of at least two central points; a calculating module, configured to calculate a distance between each user and each of the at least two central points according to the location information of multiple users and the location information of at least two central points; a clustering module, configured to cluster the multiple users into at least two groups according to the distances; an updating module, configured to update the location information of the central point according to the location information of the users in each group; and a determining module, configured to determine the vehicle site location according to the location information of the central points and the number of the users in each group if the location information of the central point satisfies the preset condition.

According to a third aspect of embodiments of the present disclosure, a non-transitory computer readable storage medium is proposed. The storage medium has stored therein instructions, that when executed by a processor of a terminal, cause the terminal to perform the above described method for determining the vehicle site location.

With the present disclosure, the vehicle site location may be set more reasonably and satisfies the user's demand, thus making it convenient for the user's travel.

DETAILED DESCRIPTION

Exemplary embodiments will be described in detail herein, and examples thereof are illustrated in accompanying drawings. Throughout figures referred by the following description, the same reference number in different figures indicates the same or similar elements unless otherwise stated. Implementations described in the following exemplary embodiments do not represent all the implementations consistent with the present disclosure. Instead, they are only examples of the device and method consistent with some aspects of the present disclosure detailed in the appended claims.

A method and a device for determining a vehicle site location according to embodiments of the present disclosure will be described hereinafter with reference to drawings.

Figure 1:
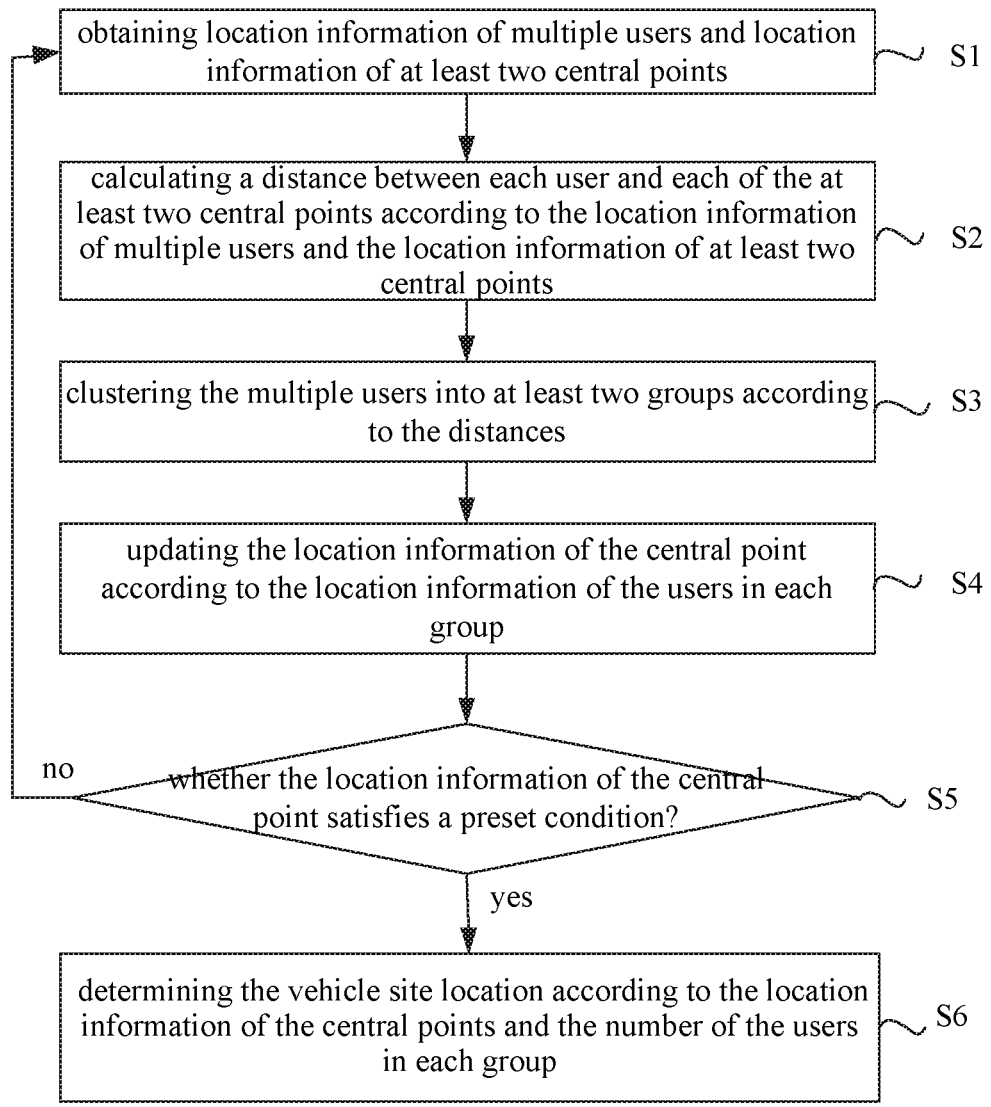
FIG. 1 is a flow chart of a method for determining a vehicle site location according to an embodiment of the present disclosure.

FIG. 1 is a flow chart of a method for determining a vehicle site location according to an embodiment of the present disclosure.

As shown in FIG. 1, the method for determining the vehicle site location may include following steps.

In step S1, location information of multiple users and location information of at least two central points are obtained.

The location information of the user may be obtained via a GPS (Global Positioning System) of a mobile terminal used by the user. The location information of the at least two central points are preset, for example, according to location information of all the users. For example, the distribution of the users in a map may be obtained, and coordinates of two points are randomly chosen in a region with relatively dense distribution and regarded as the location information of two central points.

In step S2, a distance between each user and each of the at least two predetermined central points is calculated according to the location information of multiple users and the location information of at least two central points.

Specifically, the distance between each user and each of the at least two central points may be calculated according to a following formula:

$$AB = R * \arccos[\sin(wA)\sin(wB) + \cos(wA)\cos(wB) * \cos(jA - jB)],$$

where, AB is a distance between a user A and a central point B, wA is a latitude of the user A, jA is a longitude of the user A, wB is a latitude of the central point B, jB is a longitude of the central point B, and R is a radius of the earth.

For example, assuming there are two central points M and N, a distance between User 1 and the central point M is calculated as M1, a distance between User 1 and the central point N is calculated as N1, a distance between User 2 and the central point M is calculated as M2, and a distance between User 2 and the central point N is calculated as N2, and so on.

In step S3, the multiple users are clustered into at least two groups according to the distances.

Taking the same two central points M and N as an example, distance M1 is compared to distance N1. When distance M1 is less than distance N1, User 1 may be divided to group M; when distance M1 is larger than distance N1, User 1 may be divided to group N. In the same manner, each user may be clustered to a group which is nearest in distance.

In step S4, the location information of the central point is updated according to the location information of the users in the group.

Specifically, an average value of the location information of the users in each group may be calculated, and the average value is regarded as the location information of the central point of the group. For example, assuming group M contains three users and the location information of the three users is (x1, y1), (x2, y2), and (x3, y3), then the location information of the central point of group M is ((x1+x2+x3)/3, (y1+y2+y3)/3), such that the updating of the location information of the central point is completed.

In step S5, it is determined whether the location information of the central point satisfies a preset condition. If yes, step S6 is continued, and otherwise, step S1 to step S4 are repeated until the predetermined condition is satisfied.

Since the location information of the updated central point changes, the distance between the updated central point and each user changes, and grouping of the users also changes. Therefore, there is a need to re-calculate the distance between the updated central point and each user, to group the users according to the re-calculated distances, and to iteratively update the location information of the central point until the preset condition is satisfied. The preset condition may be that the number of iterations reaches 5 times; and may also be that the number of users that changed in each group is less than a preset number like 5, etc.

In step S6, the vehicle site location is determined according to the location information of the central point and the number of the users in each group.

Specifically, if the preset condition is satisfied, the number of the users in each group may be obtained, a weight of the group is determined according to the number, and then the vehicle site location is determined according to the location information of the central point for each group and the number of the users in each group. For example, assuming that the current users are divided into two groups, a user number of group M is 40, and a user number of group N is 10. The location information of all the users in group M are obtained, and the average value of the location information of the 40 users is calculated and obtained as the location information of the central point of group M. Similarly, the location information of all the users in group N are obtained, and the average value of the location information of the 10 users is calculated and obtained as the location information of the central point of group N. Then, the distance between the central point of group M and the central point of group N is calculated according to the formula in step 2. Since there are 40 users in group M and 10 users in group N, the weight of group M may be 4, the weight of group N may be 1, and a ratio between the weight of group M and the weight of group N is 4:1. Assuming the distance between the central point of group M and the central point of group N is 100 m, then the vehicle site location may be calculated according to the ratio, which is 20 m away from the central point of group M and 80 m away from the central point of group N. If the calculated vehicle site location is not on a road in the map, a location on the nearest road and at which a vehicle can stop may be chosen as the vehicle site location.

After the vehicle site location is calculated, information of the vehicle site location may be sent to multiple users, such that the user can receive the vehicle stopping information such as a specific location of an arriving site and an arriving time in time, thus avoiding the problem of being unable to catch up with the vehicle.

According to the method for determining the vehicle site location in embodiments of the present disclosure, the vehicle site location may be set more reasonably and satisfies the user's demand, thus making it convenient for the user's travel.

The present disclosure further provides a device for determining a vehicle site location.

Figure 2:
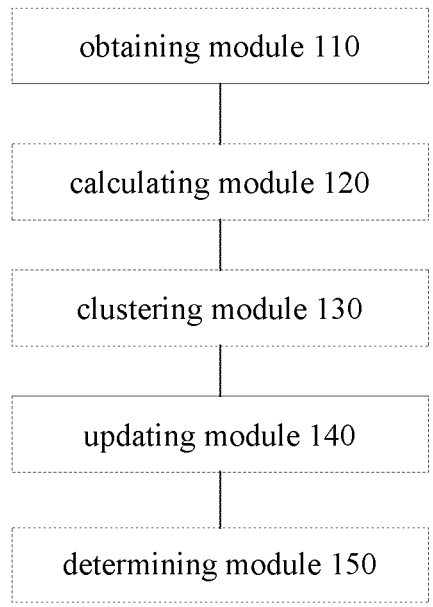
FIG. 2 is a block diagram of a device for determining a vehicle site location according to an embodiment of the present disclosure.

FIG. 2 is a block diagram of a device for determining a vehicle site location according to an embodiment of the present disclosure As shown in FIG. 2, the device for determining the vehicle site location may include: an obtaining module 110, a calculating module 120, a clustering module 130, an updating module 140 and a determining module 150.

The obtaining module 110 is configured to obtain location information of multiple users and location information of at least two central points.

The location information of the user may be obtained via a GPS (Global Positioning System) of a mobile terminal used by the user. The location information of the at least two central points are preset, for example, according to location information of all the users. For example, the distribution of the users in a map may be obtained, and in a region with relatively dense distribution, coordinates of two points may be randomly chosen and regarded as the location information of two central points.

The calculating module 120 is configured to calculate a distance between each user and each of the at least two central points according to the location information of multiple users and the location information of at least two central points.

Specifically, the distance between each user and each of the at least two central points may be calculated according to a following formula:

$$AB = R * \arccos[\sin(wA)\sin(wB) + \cos(wA)\cos(wB) * \cos(jA - jB)],$$

where, AB is a distance between a user A and a central point B, wA is a latitude of the user A, jA is a longitude of the user A, wB is a latitude of the central point B, jB is a longitude of the central point B, and R is a radius of the earth.

For example, assuming there are two central points M and N, a distance between User 1 and the central point M is calculated as M1, a distance between User 1 and the central point N is calculated as N1, a distance between User 2 and the central point M is calculated as M2, and a distance between User 2 and the central point N is calculated as N2, and so on.

The clustering module 130 is configured to cluster the multiple users into at least two groups according to the distances.

Taking the same two central points M and N as an example, distance M1 is compared to distance N1. When distance M1 is less than distance N1, User 1 may be divided to group M; when distance M1 is larger than distance N1, User 1 may be divided to group N. In the same manner, each user may be clustered to a group which is nearest in distance.

The updating module 140 is configured to update the location information of the central point according to the location information of the users in each group.

Specifically, an average value of the location information of the users in each group may be calculated, and the average value is regarded as the location information of the central point. For example, assuming group M contains three users and the location information of the three users is (x1, y1), (x2, y2), and (x3, y3), then the location information of the central point of group M is ((x1+x2+x3)/3, (y1+y2+y3)/3), such that the updating of the location information of the central point is completed.

The determining module 150 is configured to determine the vehicle site location according to the location information of the central points and the number of the users in each group if the location information of the central point satisfies the preset condition.

Specifically, if the preset condition is satisfied, the number of the users in each group may be obtained, a weight of the group is determined according to the number, and then the vehicle site location is determined according to the location information of the central point for each group and the number of the users in each group. For example, assuming that the current users are divided into two groups, a user number of group M is 40, and a user number of group N is 10. The location information of all the users in group M are obtained, and the average value of the location information of the 40 users is calculated and obtained as the location information of the central point of group M. Similarly, the location information of all the users in group N are obtained, and the average value of the location information of the 10 users is calculated and obtained as the location information of the central point of group N. Then, the distance between the central point of group M and the central point of group N is calculated according to the formula in step 2. Since there are 40 users in group M and 10 users in group N, the weight of group M may be 4, the weight of group N may be 1, and a ratio between the weight of group M and the weight of group N is 4:1. Assuming the distance between the central point of group M and the central point of group N is 100 m, then the vehicle site location may be calculated according to the ratio, which is 20 m away from the central point of group M and 80 m away from the central point of group N. If the calculated vehicle site location is not on a road in the map, a location on the nearest road and at which a vehicle can stop may be chosen as the vehicle site location.

Figure 3:
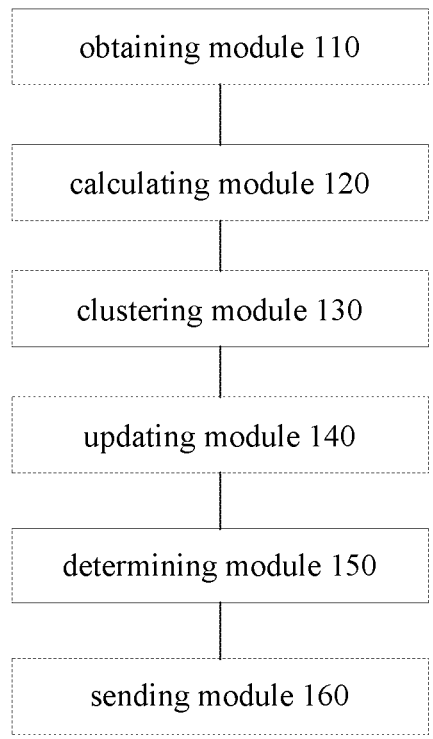
FIG. 3 is a block diagram of a device for determining a vehicle site location according to another embodiment of the present disclosure.

In addition, as shown in FIG. 3, the device for determining the vehicle site location in the embodiments of the present disclosure may further include a sending module 160.

The sending module 160 is configured to send information of the vehicle site location to the multiple users after the determining module 150 determines the vehicle site location, such that the user can receive the vehicle stopping information such as a specific location of an arriving site and an arriving time in time, thus avoiding the problem of being unable to catch up with the vehicle.

According to the device for determining the vehicle site location in embodiments of the present disclosure, the vehicle site location may be set more reasonably and satisfies the user's demand, and it is convenient for the user's travel.

It should be noted that, in the description of the present disclosure, terms such as "first" and "second" are used herein for purposes of description and are not intended to indicate or imply relative importance or significance. In addition, in the description of the present disclosure, "a plurality of" means two or more than two, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which may not follow a shown or discussed order according to the related functions in a substantially simultaneous manner or in a reverse order, to perform the function, which should be understood by those skilled in the art.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for determining a vehicle site location, comprising:
   obtaining location information of multiple users and location information of at least two central points;
   calculating a distance between each user and each of the at least two central points according to the location information of multiple users and the location information of at least two central points;
   clustering the multiple users into at least two groups according to the distances;
   updating the location information of the central point according to the location information of the users in each group;
   determining whether the location information of the central point satisfies a preset condition, the preset condition being that the number of iterations reaches five times or the number of users that changed in each group is less than a preset number;
   in response to determining that the location information of the central point does not satisfy the preset condition, repeating the obtaining, the calculating, the clustering, the updating and the determining whether the location information of the central point satisfies a preset condition; and
   in response to determining that the location information of the central point satisfies the preset condition, determining the vehicle site location according to the location information of the central points and a number of the users in each group.

2. The method according to claim 1, wherein, the distance between each user and each of the at least two central points is calculated according to a formula of $$AB = R * \arccos[\sin(wA)\sin(wB) + \cos(wA)\cos(wB) * \cos(jA - jB)],$$

where, AB is the distance between a user A and a central point B, wA is a latitude of the user A, jA is a longitude of the user A, wB is a latitude of the central point B, jB is a longitude of the central point B, and R is a radius of the earth.

3. The method according to claim 1, wherein, updating the location information of the central point according to the location information of the users in each group comprises:
   calculating an average value of the location information of the users in each group, and updating the location information of the central point according to the average value.

4. The method according to claim 1, wherein, determining the vehicle site location according to the location information of the central points and the number of the users in each group comprises:
   obtaining the number of users in each group, and determining a weight of each group according to the number of users in each group; and
   calculating the vehicle site location according to the weight and the location information of the central points.

5. The method according to claim 4, further comprising:
   sending information of the vehicle site location to the multiple users.

6. A device for determining a vehicle site location, comprising:
   one or more computing devices executing one or more software modules, the one or more software modules comprising:
   an obtaining module, configured to obtain location information of multiple users and location information of at least two central points;
   a calculating module, configured to calculate a distance between each user and each of the at least two central points according to the location information of multiple users and the location information of at least two central points;
   a clustering module, configured to cluster the multiple users to at least two groups according to the distances;
   an updating module, configured to update the location information of the central point according to the location information of the users in each group; and
   a determining module, configured
      to determine whether the location information of the central point satisfies a preset condition, the preset condition being that the number of iterations reaches five times or the number of users that changed in each group is less than a preset number,
      to repeat the obtaining module, the calculating module, the clustering module, the updating module and the determining module in response to determining that the location information of the central point does not satisfy the preset condition, and
      to determine the vehicle site location according to the location information of the central point and a number of the users in each group in response to determining that the location information of the central point satisfies the preset condition.

7. The device according to claim 6, wherein, the calculating module is configured to calculate the distance between each user and each of the at least two central points according to a formula of $$AB = R * \arccos[\sin(wA)\sin(wB) + \cos(wA)\cos(wB) * \cos(jA - jB)],$$

where, AB is a distance between a user A and a central point B, wA is a latitude of the user A, jA is a longitude of the user A, wB is a latitude of the central point B, jB is a longitude of the central point B, and R is a radius of the earth.

8. The device according to claim 6, wherein, the updating module is configured to:
   calculate an average value of the location information of the user in each group; and
   update the location information of the central point according to the average value.

9. The device according to claim 6, wherein, the determining module is configured to:

obtain the number of users in each group, and determine a weight of the group according to the number; and calculate the vehicle site location according to the weight and the location information of the central point.

10. The device according to claim 9, wherein the one or more software modules further comprises:

a sending module, configured to send information of the vehicle site location to the multiple users.

11. A non-transitory computer readable storage medium having stored therein instructions that, when executed by a processor of a terminal, cause the terminal to perform a method for determining a vehicle site location, the method comprising:

obtaining location information of multiple users and location information of at least two central points;

calculating a distance between each user and each of the at least two central points according to the location information of multiple users and the location information of at least two central points;

clustering the multiple users into at least two groups according to the distances;

updating the location information of the central point according to the location information of the users in each group;

determining whether the location information of the central point satisfies a preset condition, the preset condition being that the number of iterations reaches five times or the number of users that changed in each group is less than a preset number;

in response to determining that the location information of the central point does not satisfy the preset condition, repeating the obtaining, the calculating, the clustering, the updating and the determining whether the location information of the central point satisfies a preset condition; and in response to determining that the location information of the central point satisfies the preset condition, determining the vehicle site location according to the location information of the central points and a number of the users in each group.

* * * * *